US009604411B2

(12) United States Patent
Rogren

(10) Patent No.: US 9,604,411 B2
(45) Date of Patent: Mar. 28, 2017

(54) MULTI-MATERIAL THREE DIMENSIONAL PRINTER

(71) Applicant: EoPlex Limited, Hong Kong (CN)

(72) Inventor: Philip E. Rogren, Half Moon Bay, CA (US)

(73) Assignee: EoPlex Limited, Hong Kong (CN)

( * ) Notice: Subject to any disclaimer, the term of this patent is extended or adjusted under 35 U.S.C. 154(b) by 42 days.

(21) Appl. No.: 14/702,946

(22) Filed: May 4, 2015

(65) Prior Publication Data

US 2015/0314530 A1 Nov. 5, 2015

Related U.S. Application Data

(60) Provisional application No. 61/988,266, filed on May 4, 2014.

(51) Int. Cl.
*B29C 67/00* (2006.01)
*B33Y 10/00* (2015.01)
*B33Y 30/00* (2015.01)
*B29L 9/00* (2006.01)

(52) U.S. Cl.
CPC ...... *B29C 67/0085* (2013.01); *B29C 67/0081* (2013.01); *B33Y 10/00* (2014.12); *B33Y 30/00* (2014.12); *B29L 2009/005* (2013.01)

(58) Field of Classification Search
None
See application file for complete search history.

(56) References Cited

U.S. PATENT DOCUMENTS

| | | | | |
|---|---|---|---|---|
| 6,363,606 B1* | 4/2002 | Johnson, Jr. | ............ | B22F 3/008 264/496 |
| 2001/0050448 A1* | 12/2001 | Kubo | .................. | B29C 67/0077 264/308 |
| 2006/0192315 A1* | 8/2006 | Farr | ..................... | B29C 67/0081 264/113 |
| 2008/0018018 A1* | 1/2008 | Nielsen | ............... | B29C 67/0081 264/308 |
| 2013/0244040 A1* | 9/2013 | Oshima | ............... | B29C 67/0074 428/411.1 |
| 2015/0165679 A1* | 6/2015 | Goto | .................... | B29C 67/0081 264/308 |
| 2016/0052016 A1* | 2/2016 | Te | ......................... | B05D 3/002 427/290 |

* cited by examiner

*Primary Examiner* — Mary F Theisen

(57) ABSTRACT

A layer of a first powder is dispensed in a layer over a build plate. Binder is then selectively applied to hold portions of the layer of first powder together. Unbound first powder is then removed. A second powder is then dispensed in a layer over the build plate and portions of the bound first powder above the build plate. Binder is then selectively applied to hold portions of the second powder together. Unbound second powder is then removed. A third or more different powders can be similarly dispensed and bound to complete a multi-material layer. The process is then be repeated on a next subsequent layer. A curing radiation source can accelerate binding of powder together. Voids can be formed in portions of the layers by dispensing a fugitive material in portions of each multi-material layer. Mechanisms for implementing the printing process are also disclosed.

33 Claims, 3 Drawing Sheets

MULTI-MATERIAL THREE DIMENSIONAL PRINTER

CROSS-REFERENCE TO RELATED APPLICATIONS

This application claims benefit under Title 35, United States Code §119(e) of U.S. Provisional Application No. 61/988,266 filed on May 4, 2015.

FIELD OF THE INVENTION

The following invention relates to three dimensional printers and printing methods which print with multiple different materials. More particularly, this invention relates to three dimensional printers and methods which have multiple different material powder dispensers that place their materials in different parts of a layer being formed, and binding the different material powders together before printing a next layer upon a previous completed layer.

BACKGROUND OF THE INVENTION

Three dimensional (3D) printing or additive manufacturing holds enormous promise as a manufacturing technique because it replaces the tooling necessary for conventional techniques with a CAD/CAM system directly driving the fixing of material into an object defined in the CAD file. All of the basic approaches to 3D printing are designed to use a single type of material for any portion of an object, and for any object created with the printer. The class of printers employing the technique known as fused deposition modeling (FDM), come closest to enabling the use of multiple materials. FDM machines use filaments of material that can be melted and extruded through a computer controlled print head, and then solidified shortly after the material leaves the extruder, to form a build-up according to the design in the CAD file. By employing more than one print head, each with a different type of filament, models of more than one material may be created. While these different filaments do represent different types of polymeric materials, the technique is limited to low melting point, largely organic materials.

Because FDM printers require the print head to trace every voxel in a 3D model, one voxel at a time, and at rates compatible with melting and extruding material, they are quite slow to produce an object of any significant volume. Because of this, FDM printers are used primarily to create models or prototypes.

3D printers based on binder jetting hold the greatest promise in terms of flexibility in the materials that are usable, and in the potential for increasing productivity substantially over other types of 3D printers. Binder jetting based 3D printers us an ink jet type printer head to spray glue onto a thin layer of powder, which, when set, forms a solid sheet of glued together powder, in the configuration defined by the pattern the computer dictated to the print head, for a given layer of an object. After the glue is set, a next thin layer of powder is spread over the original layer, and the patterned jetting of glue, or binder, is repeated in the pattern for that layer. After each layer is thusly patterned, the work piece is indexed away from the print head sufficiently to leave the relationship between the ink jet and the powder bed the same as it was for the first layer. The powder that was not patterned with the binder, remains where it was originally deposited and serves as a foundation for powder/binder sections deposited in areas not previously patterned with binder, and as support for the powder/binder structure. When deposition of the part is complete, the powder not patterned with binder is removed.

Current systems use powders ranging from plaster of Paris, bound with water for physical prototypes, to sand, bound by a glue for sand casting cores, to metal bound with glue, and subsequently sintered to a finished metal part. None of the current systems are capable of creating an object with different regions of the object comprised of different material.

SUMMARY OF THE INVENTION

The objective of the current invention is to provide a three dimensional (3D) printer that is capable of creating fully free form, 3D objects, with regions within the object comprised of different materials, and with the capability of creating void spaces within such objects, with tortured exit pathways (or even no aperture to the outer surface of the object). Objects created with the present invention could be complete after the printing process is complete, but more commonly, the printed object will be treated in a way to densify the powders of different materials, while removing the binder material, to yield components of the object that have properties similar to those of the solid material from which the powder material is derived. Specifically, for example, powdered alumina ceramic will acquire the same properties as a solid piece of alumina ceramic, and powdered steel alloy will attain the same properties as a bar of that steel alloy created by conventional powder metallurgy techniques. Alternatively, the object may be treated sufficiently to just bind the particles of powder together, while removing the unbound powder material, leaving a void space, or the void spaces may be filled with another material by infusion.

The present invention utilizes certain aspects of the binder jetting systems employed on current binder jetting systems. Specifically, the present invention incorporates multiple nozzle, ink jet type heads, and associated driver electronics and computers, to dispense a binding material. The current invention may also incorporate a second similar, multi nozzle, head to dispense a different binder material, and/or a volume filling material such as a fugitive material. The current invention also utilizes powder coating systems similar to those used in conventional binder jetting systems to deposit a thin layer of powder that is well controlled to thickness and powder density.

While the conventional binder jetting systems use one powder coating system to deposit a single material for the whole build, the present invention incorporates more than one powder coating system, each of which deposits a different material. Each of the multiple materials may be deposited on each layer of the object being printed, or any layer may use only one, or a subset of the total number of available materials. Each powder coating system, when it is activated, preferably deposits a uniform and unpatterned layer of powder over all of the printable surface, or in some cases over only a selected portion of the printable surface that is intended to be patterned with that specific material.

Patterning a given material with binder may be done, as is conventional with binder jetting, after the powder is deposited in the print space, or the binder may be deposited by the inkjet head, on the previously completed layer, onto which the powder is deposited and the binder allowed to absorb into and wet all of the powder within the pattern. These two techniques may be combined within a given object. With either pre-jetting, or post-jetting of the binder into the powder, the binder is cured, typically by the application of some form of curative energy, such as ultra violet light, or thermal energy, forming a robust pattern of powder bound together by cured binder material.

To facilitate the use of multiple materials on any layer, the powder that is not bound together into the layer of the object, is removed from the printing area prior to deposition of the next material. Each subsequent material within the layer of the printed object is completed by sequential cycles of powder deposit, patterned binder jetting, cure and removal of the excess powder. When all of the materials on a layer have been deposited, bound and cured, the space between the printed object and the inkjet heads is indexed in relation to the previously completed layer to maintain the appropriate relationship between the printing surface and the printer head. Because it is often desirable to change the thickness of any given layer in an object, in consideration of the necessary change in design from one layer to the next, or in consideration of the precision of the pattern needed within a given layer or section, the completed layer thicknesses and thus the amount the partially printed object is indexed relative to the print head, may be different with every completed layer.

Removal of the excess powder at the end of each material deposition step provides for the application of subsequent materials in the same layer, keeps removed powders of different materials at least largely separate, eliminates the need to remove the excess powder at the end of the printing process, and in general, speeds the printing process. It also eliminates the support for the printed structure, and foundations for any portions of the object that were not printed in previous layers. These functions can easily be provided as needed by support structures of one of the functional materials or by a fugitive material that will be removed from the object in subsequent processing, leaving voids.

In one embodiment of the current invention, the powder coating mechanism will coat an area as wide as the build platform and move in coordination with the print head. In this preferred embodiment each layer of powder is deposited in a single continuous operation, as the coating mechanism traverses the entire build platform. After the deposition of a layer of powder is complete, the coating mechanism retreats to allow access of the print head to the area of the build platform plate.

For every material to be used in a specific object, a separate powder deposition mechanism is provided. Each of these powder deposition mechanisms is movable to be indexed into position to perform a powder coating operation, and when that layer of powder is complete, moving to a parking spot to clear the way for the binder print jet head or a powder removal mechanism or a subsequent powder deposition mechanism for a different powder to be coated on the current layer. The separate powder deposition mechanisms could be carried together in one embodiment, but caused to deposit powder (or not) in sequence, separated by binding, curing and powder removal steps.

In another embodiment of the current invention, the powder coating mechanism will coat an area as wide as the multi nozzle print head and move in coordination with the print head. This embodiment is particularly valuable in situations where the binder is pre-jetted in the desired pattern, in preparation for deposition of the powder. Close coordination of the powder deposition with the deposition of the binder allows for more uniform timing between jetting of the binder and introduction of the powder, which improves the control of any absorption, flow, or drying of the binder.

In another embodiment of the current invention, the powder coating system employs a system of valves that can be opened and closed as the powder coater traverses the printing area, such that the area actually coated with powder can be controlled to the degree that no excess powder is deposited, and all of the powder deposited is coated with binder. Alternatively, if the resolution of the binder jetting head is greater than the resolution of the powder valve system, only a minimum amount of excess powder is deposited, outside the area to be treated with binder. This feature has the effect of shortening the printing time. While the excess powder is captured by a removal system such as a vacuum cleaner, and each type of material is collected separately for recycling. This also allows for some level of purification and/or reprocessing if necessary. Depositing only the minimum amount of powder necessary to complete the designed pattern on a given layer reduces materials cost, particularly in the case of precious materials or materials that require extensive reprocessing in order to be reused.

In the present invention, 3D parts are printed in a build volume, defined by a build platform/plate that can be virtually any size ranging from a square or rectangular shape a few tens of centimeters on a side to meters on a side. The build platform is controlled by the computer such that it can be moved down away from the print head as each layer is completed. The build platform serves as the foundation for the first layer of the build of one or more objects, and is provided with a mechanism that ensures sufficient adhesion of the build object(s) to the platform during the printing operation, and also provides for easy removal of the completed object or objects after the build object(s) is complete. Because the present invention is applicable to parts of a wide range of sizes, but very often significantly smaller than the total build volume, many of the same parts, or parts of different design, but requiring the same of materials set, may be printed in a single build. Small parts may be printed in arrays such as to maximally utilize the available area of the build platform, and also printed in stacks, to maximally utilize the print volume. Thus, a given build may yield from one to thousands of completed parts, of a single, or multiple designs. The print volume is defined by the area of the build platform times the maximum displacement of the build platform from the starting position relative to the print head.

OBJECTS OF THE INVENTION

Accordingly, a primary object of the present invention is to provide a mechanism for three dimensional printing of objects comprised of more than one material or composite material.

Another object of the present invention is to provide a binder jetting type of three dimensional printer capable of incorporating regions of different materials in a 3D printed object.

Another object of the present invention is to provide a binder jetting type of 3D printer that has the capability of creating highly controlled layers of several different materials.

Another object of the present invention is to provide a 3D printer with the capability of embedding regions of fugitive materials within an object comprised largely of robust, enduring materials, so the fugitive materials can be later turned into voids in the object.

Another object of the present invention is to provide a 3D printer with the capability of embedding voids within an object comprised largely of robust, enduring materials, while there is only a tortured path, or no path at all from the empty voids to the outside surface of the printed object.

Another object of the present invention is to provide a means for creating 3D objects, directly from computer design data, from high performance engineering materials rather than materials chosen to work with a specific 3D printer process.

Another object of the present invention is to provide a 3D printer that has build rates that are high enough to be cost competitive with conventional methods of creating objects comprised of multiple materials and void regions within the structure.

Other further objects of the present invention will become apparent from a careful reading of the included drawing figures, the claims and detailed description of the invention.

BRIEF DESCRIPTION OF THE DRAWINGS

FIG. 2 shows a partially completed, 3D printed object of the present invention, being coated with a layer of a first powder material to provide a fifth completed layer for the object.

FIG. 3 shows the object of FIG. 2 in the midst of binder being selectively jetted into the layer of the first powder material.

FIG. 4 shows the object of FIG. 3 with the binder jetting limited in area to define a pattern as directed by a CAD file and computer or other control.

FIG. 5 shows the object of FIG. 4 after the binder jetting of the first powder material is complete and the binder jetted into the first powder material has been cured, and the excess powder removed.

FIG. 6 shows the object of FIG. 5 after a second powder material has been deposited over the entire partially completed object.

FIG. 7 shows the object of FIG. 6 partially through the process of jetting binder into the second powder material.

FIG. 8 shows the object of FIG. 7 after the binder jetting into the second powder material is complete and the binder jetted into the second powder material has been cured, and the excess powder removed, completing this additional layer of the object.

DESCRIPTION OF THE PREFERRED EMBODIMENT

Figure 1:
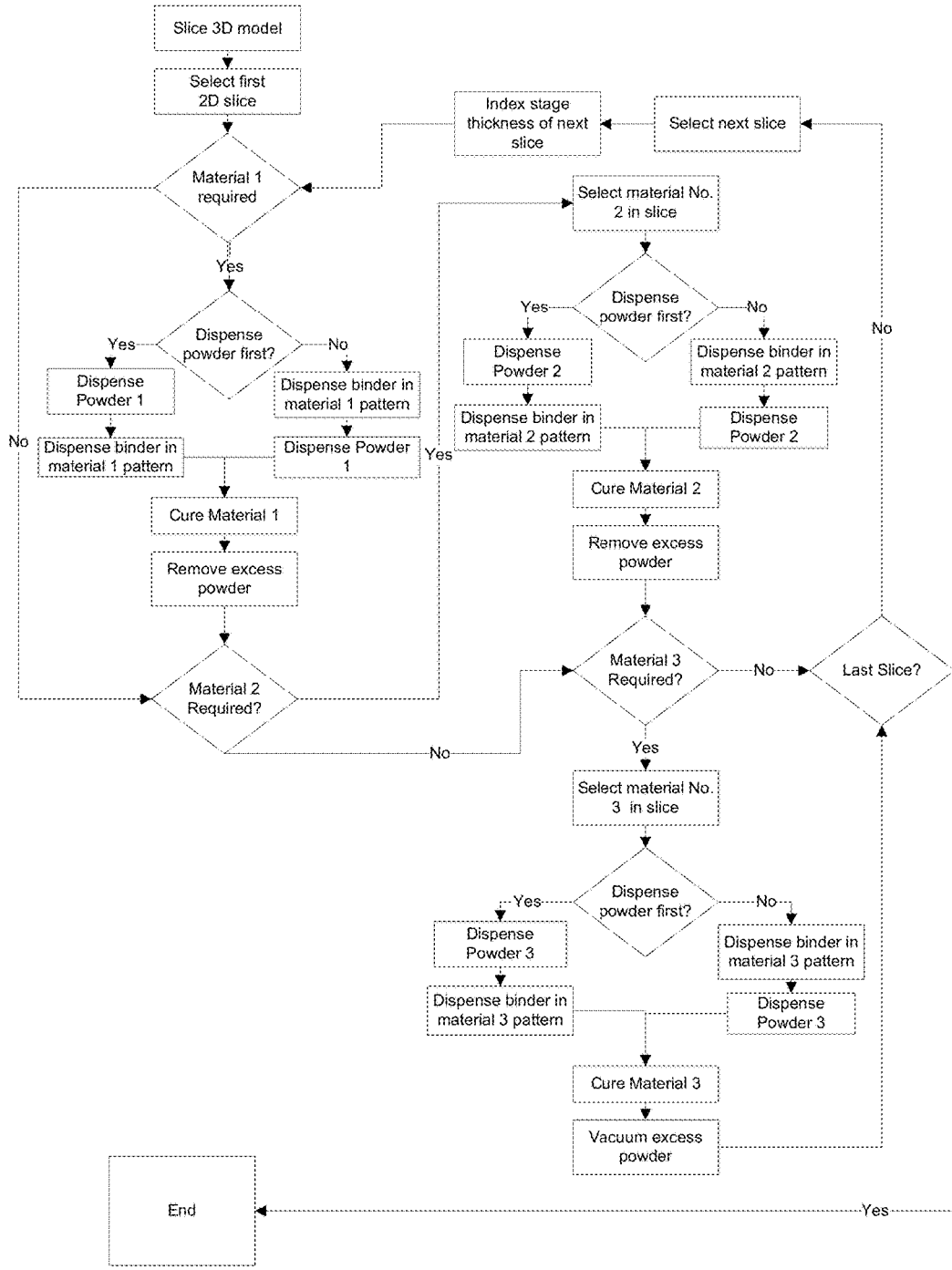
FIG. 1 shows a flow chart of a process carried out by the present invention in one embodiment to make an object with three materials.

Referring to the drawings, wherein like reference numerals represent like parts throughout the various drawing figures, this invention is directed to a printer which prints in three dimensions with multiple materials. The printer includes a build plate 10 (FIG. 9) upon which an object or array of objects 15 are built in sequential layers. Each completed layer can be formed of a first material 20 and a second material 30 (and additional materials) limited to different portions thereof. Voids can also be provided within individual layers by filling such portions of the layers with fugitive material which is later removed.

The basic process implemented by this invention is depicted in the flow chart of FIG. 1. First, an object to be printed begins as a three dimensional model and is sliced into multiple two dimensional slices which can be oriented parallel to and above the build plate 10. A first slice is selected. If a first material is required within this slice, first material powder and binder are applied, in either order, to cause the first material powder to be bound where required within the layer. Binding can be accelerated by curing, such as through a radiation source. Excess first material powder is removed. If the layer requires a second material, this process is repeated, but with a second material. The process can also be repeated with a third material (and potentially other additional materials). If voids are required in the layer/slice, they can be filled with a fugitive material. When the layer is complete, a next slice of the object to be printed is used to control a repeat of the process, but with the geometry required for the second slice. The process continues until the last slice is fully printed. Finally, typically the object is finished by heating, such as to a sintering temperature to sinter the powders together, and with sufficient heat to cause fugitive material to volatilize and leave behind a void within the object.

With specific reference to FIGS. 2-9, the present invention first provides a build plate 10 upon which the 3D printing of the object is carrier out. The object is built up in layers of powder material, bound together by a binder material delivered in a computer controlled pattern by an inkjet type print head 150.

Figure 2:
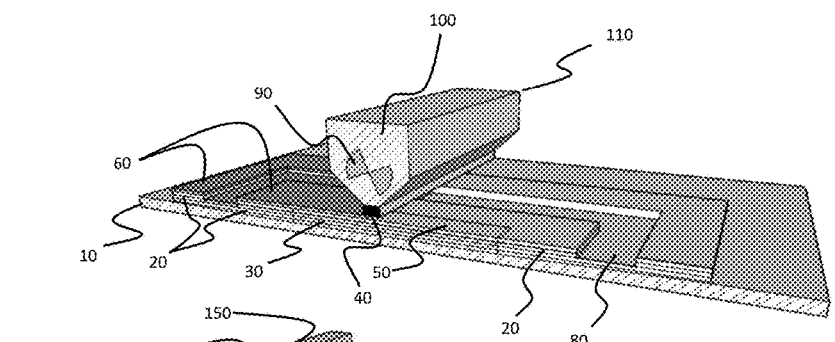
FIGS. 2-8 show a perspective view of the stages of the process carried out by the present invention to form one additional layer on an object comprised of two materials.

FIG. 2 illustrates an example of a partially completed object, with four completed layers, each comprised of a first material 20, and a second material 30, and two of those four completed layers, further having regions containing no printed material 80. Such voids could be left open or could be filled with layers of fugitive material to facilitate printing over the voids in subsequent layers. FIGS. 2-8 depict the creation of a fifth complete layer. In FIG. 2, a powder dispersal mechanism 110 provides one form of dispenser that dispenses a layer of a first powder 60 over all of the completed portion of the printed object, including over the region 50 of the second material 30 and into the trench 80 where no printed material exists on the third or fourth completed layers. The powder dispersal mechanism comprises of a powder reservoir 100, a powder agitator/conditioner 90 and a dispersal head 40. The dispersal head may contain valves that allow for computer controlled opening to dispense the first powder only on selected areas. The powder dispersal mechanism traverses the entire length of the build plate from a first end to a second end opposite the first end, at a rate chosen to dispense a uniform layer of the first powder 60 of the desired thickness.

Figure 3:
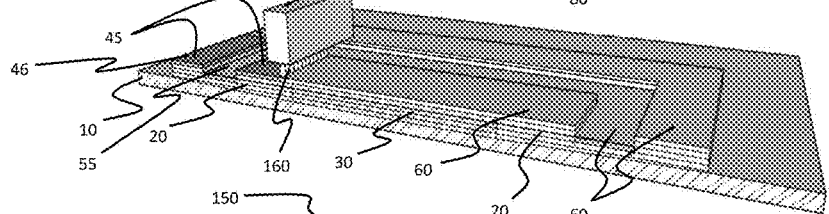

In FIG. 3, the layer of the first powder 60 has been dispersed over the entire exposed surface of the partially printed object, and the multi nozzle print head 150 has traversed across a portion of the object from left to right in the illustration. As the print head moves across the object, the computer controls the operation of each of the nozzles in accordance with the design of the layer being printed. Specifically, the print head 150 dispenses binder material over its full width on the first edge 46 of the object and is then turned off completely as it traverses a left part 55 of the trench 80.

Figure 4:
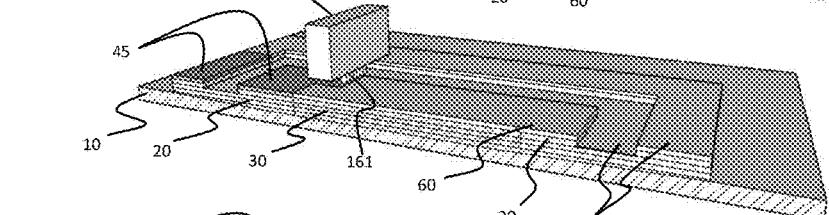

As the print head reaches the central raised portion 45, binder jetting commences over the center portion 45 where only the jets 160 over the center raised portion 45 are turned on under computer (or other) control. The area in which the binder was dispersed from the printer head is indicated by the darker shading, and the area of powder 60 not jetted with binder is indicated by the lighter shading. FIG. 4 illustrates the object under construction as the print head 150 has traversed over the region 50 of the second material where the jets over the region 50 of the second material 30 are turned off, and only the jets over a first material 20 area of a center raised portion 161 are turned on.

Figure 5:
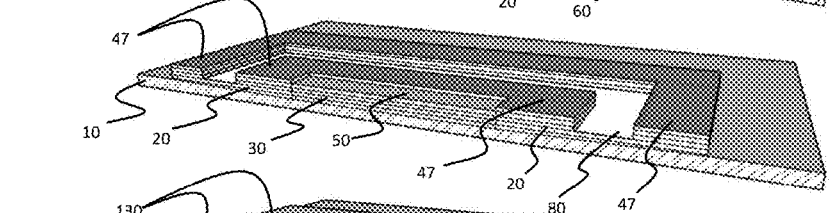

FIG. 5 illustrates the object after binder has been jetted into all of the first material 20 intended to be a part of the fifth layer 47 and the binder has been cured and the excess powder 60 removed. The trench 80 is shown unshaded in this view to illustrate that the powder has been removed. The region 50 has also had powder removed but is shown with light shading. Removal could be by vacuuming or by sweeping or by blowing or by magnetic or static attraction for suitable materials, or by other removal techniques.

Figure 6:
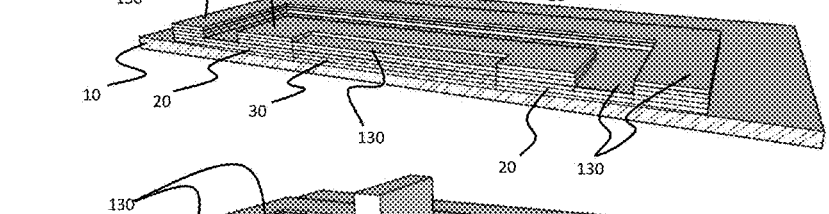

FIG. 6 illustrates the object under construction after a layer of a second powder 130 has been dispersed over the entire exposed surface of the partially completed object. The second powder 130 is dispersed with a second powder dispersal mechanism 111 (FIG. 9), similar to that used to disperse the first powder 60. The second powder 130 is dispersed over the entire upper surface of the object.

This second powder 130 layer is multi-planar, with some second powder 130 placed upon the bound first powder 60 and some second powder 130 placed within the fifth layer of the object being printed. However, the second powder 130 that is placed upon the bound first powder 60 is not bound, but rather removed so that the sixth layer of the object can be printed on a flat surface (unless unfilled voids are present). If desired, the second powder 130 can be limited to not be placed where the bound first material 60 exists to avoid waste of second powder 130.

Figure 7:
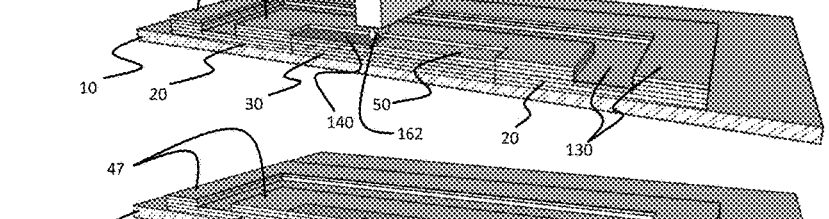

FIG. 7 illustrates the binder 162 jetting into the second powder 130 layer only over the second material region 50 of the object. In another embodiment of the present invention, the sequence of powder coating and binder jetting may be reversed for any, or all materials on any, or all layers, depending upon geometry and precision factors within a given design.

Figure 8:
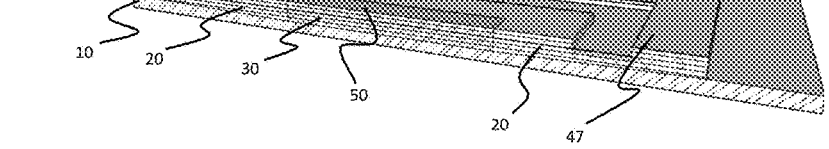

FIG. 8 illustrates the object under construction with the jetting of binder into the second powder 130 completed. Also, binder has been jetted into the trench 80 to add a layer of the second powder 130 thereto. The binder is cured, and the excess powder is removed, completing the completed fifth layer 47 of the object. It is noted that reference to first material layers and second material layers (and additional material layers) refers to sub-layers that can comprise a full layer of the object being printed, but most typically are only part of the completed layer which together, along with possible fugitive material, comprise a completed layer of the object.

While the above example depicts an object comprised of two different materials, the present invention is capable of creating objects with many more materials simply by adding additional powder dispersal mechanisms 110, 111, 112 (FIG. 9), preferably of the same type as illustrated in FIG. 2. Additionally, fugitive materials may be jetted directly into cavity areas within the object by a second, jetting type print head, specifically designed for the fugitive materials. Then, when a later sintering or other heating step is performed, the fugitive materials volatilize (into a gas typically), leaving a void/cavity in the object where called for by the design.

Figure 9:
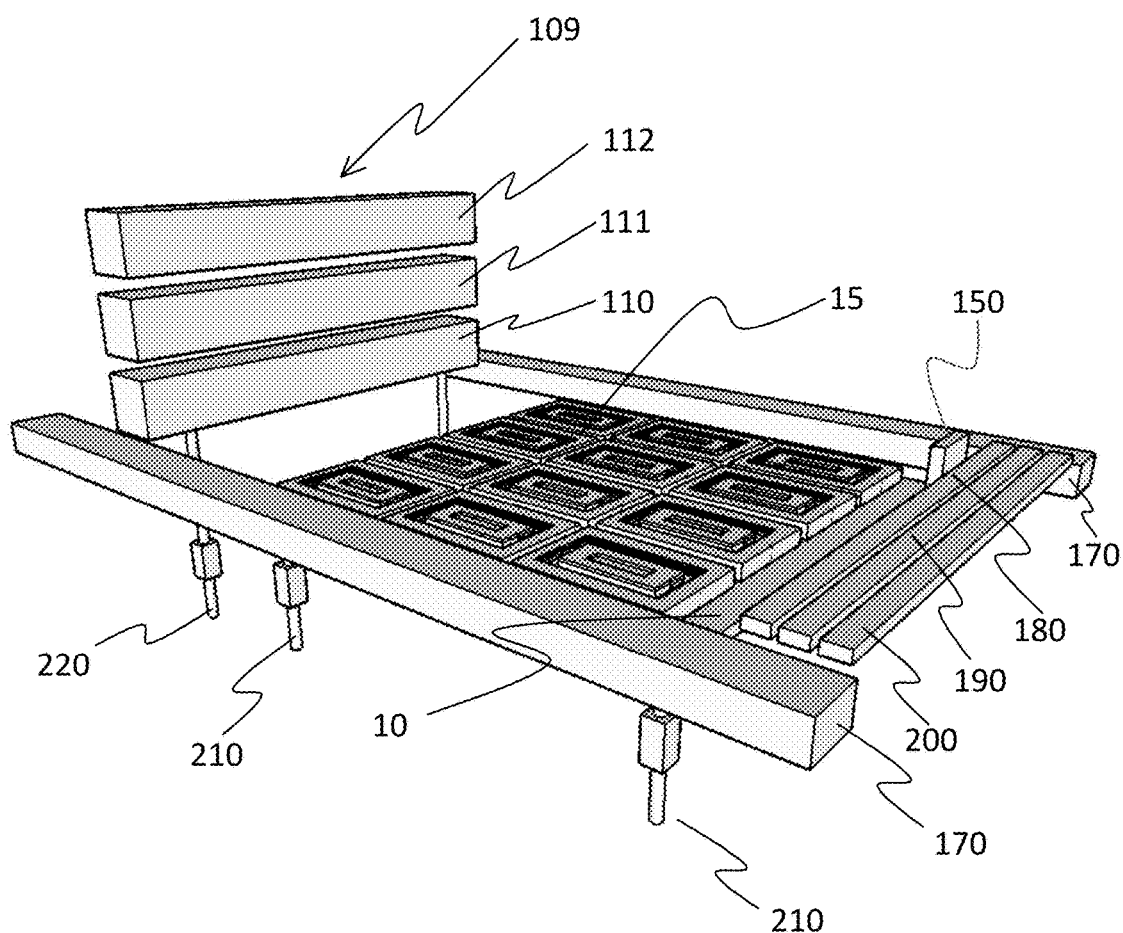
FIG. 9 is a perspective view of major parts of the present invention in one embodiment.

FIG. 9 illustrates the major portions of the present invention in a perspective form. The build plate 10 provides a foundation for starting the 3D printing of the array 15 of objects to be built. While a single object could be formed, in this embodiment multiple objects are simultaneously formed which are shown as identical but could be different.

The build platform 10 itself is mounted on an elevator system 210 to allow the top of the completed layers to be indexed optimally with respect to the powder dispersal mechanism 110 and the print head 150, for each new layer, such as by moving down from an active printing plane after each layer is completed. All of the other major components of the present invention are in this embodiment mounted, either directly or indirectly, to a major axis transport mechanism 170 which itself is attached to a frame of the printer.

The major axis transport mechanism 170 provides one form of a means to traverse a powder dispersal mechanism 110, 111, 112, the print head 150 (through a minor axis transport mechanism 180 associated therewith), curing radiation source 190 (or other binder accelerant), and the excess powder removal system 200 (such as a vacuum), across the top surface of the array of objects 15, in a highly controlled manner by the computer interpreting the CAD file (or other control). For instance, translating clamps on each mechanism 170 can selectively grab ends of one (or more) of these components and together advance the component(s) over the array 15 and then back to a dock for release by the clamps and selection of other components to traverse the active printing plane above the build plate.

The powder dispersal system 109 is comprised of two or more powder dispersal mechanisms 110, 111, 112, that are in this embodiment arranged in a magazine system, such as an elevator 220, that allows the computer (or other control) to select the powder dispersal mechanism that contains the proper powder material for the current layer and region of the object array to be printed, and to be engaged with the major axis transport mechanism 170. Once engaged with the transport mechanism 170, the powder dispersal mechanism 110, 111, 112 can be traversed across the length of the build plate 10, preferably at a precisely controlled powder delivery rate. In a preferred embodiment, the powder dispersal mechanism 110, 111, 112 will also incorporate a series of valves that control the locations across the width of the powder dispersal mechanism 110, 111, 112, where powder is dispensed onto the array of objects under construction. Said valves will be controlled to dispense the minimum amount of powder material to form the regions intended for the given material and layer. Thus, the powder can either be dispensed over the entire surface or only over selected regions.

The print head 150 is itself attached to the minor axis transport mechanism 180, such that, under the control of the computer, the print head can be traversed to any location across the width of the build plate 10. The minor axis transport mechanism 180 is itself engaged with the major axis transport mechanism 170, such that under control, the minor axis transport mechanism 180 may traverse the full length of the build plate 10. In this way, the print head 150 can be moved to any location above the build plate 10, and in any pattern of movement in the x-y plane. As an alternative, the print head 150 could be as wide as the minor axis transport mechanism 180 so it would not need to move relative to the mechanism 180.

In one embodiment, a curing radiation source 190 is engaged with the major axis transport mechanism 170, such that the curing radiation source 190 may traverse the entire length of the build plate 10. In one embodiment, the radiation curing source 190 constitutes a series of UV LEDS, individually addressable by the computer. In another embodiment, the radiation curing source 190 constitutes an IR source, capable of curing the binder in a very short time. In another embodiment, the curing radiation source 190 constitutes a UV source, a fraction of the width of the build platform, engaged with a second minor axis transport mechanism 180, which is in turn engaged with the major axis transport mechanism 170, such that the UV source may be traversed to any point above the build plate 10, and traversed at a desired rate.

In yet another embodiment of the present invention, the curing radiation source constitutes a wide area UV or IR source (typically stationary or only movable vertically) that illuminates the entire active printing plane above the surface of the build plate 10 at the same time. The wide area UV or IR source may be fixed in location above the build plate 10, arranged such that the powder dispersal mechanisms 110, 111, 112, the print head 150, and the excess powder removal system 200 may traverse the build plate 10 under the radiation source. In yet another embodiment of the present invention, the wide area UV or IR curing radiation source may be movable such that it can move to a location directly above the build plate during the curing step, and remove to an out-of-the-way location during the remainder of the 3D printing operation.

In a preferred embodiment, the excess powder removal system 200 constitutes a high volume vacuum head, extending the full width of the build plate 10. Said excess powder removal system is engaged with the major axis transport system 170, to allow the excess powder removal system 200 to traverse the full length of the build plate 10, to vacuum up any powder that is not coated with binder and cured. In a preferred embodiment of the present invention, a separate excess powder removal system is provided for each of the powder dispersal mechanisms 110, 111, 1112 in order to keep the several materials separated and minimize (or even eliminate) the purification or refurbishment of the excess powder before it is reintroduced to the process. In one embodiment of the present invention, the several excess powder removal systems are affixed to the corresponding powder dispersal mechanism 110, 111, 112. If high purity is not required, vacuumed powder can thus be immediately reused. Alternatively, the recycling/refurbishment process for each mechanism 110, 111, 112 is kept substantially limited to a single type of powder.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A multi-material three dimensional printer, comprising in combination:
a build plate;
a major transport mechanism movable along a major axis of said build plate and a minor transport mechanism movable along a minor axis of said build plate, said transport mechanisms in engageable coordination with each other,
a first powder dispenser of a plurality of powder dispensers mountable on said major transport mechanism movable over at least portions of said build plate to place a first powder layer above said build plate;
a binder jet of a plurality of binder jets mountable on said minor transport mechanism movable over at least portions of said build plate along said minor axis to place binder and bind the first powder together in locations where the binder is placed;
a first powder remover mountable on said major transport mechanism movable over at least portions of said build plate along said major axis to remove unbound first powder in the first powder layer;
a second powder dispenser of the plurality of powder dispensers movable over at least portions of said build plate along said major axis to place a second powder layer above said build plate, the second powder different from the first powder.

2. The printer of claim 1 wherein a mover is interposed between said build plate and said first powder dispenser, said binder jet and said second powder dispenser to move said build plate relative to said first powder dispenser, said binder jet and said second powder dispenser.

3. The printer of claim 2 wherein said mover includes an elevator for said build plate, said elevator lowering said build plate after the second powder layer is complete.

4. The printer of claim 1 wherein said first powder dispenser is movable over the entire said build plate.

5. The printer of claim 1 wherein said first powder dispenser and said binder jet move together, one following the other over the build plate.

6. The printer of claim 5 wherein said second powder dispenser and said binder jet move together, one following the other over the build plate.

7. The printer of claim 1 wherein a curing radiation source of a plurality of curing radiation sources is movable over at least portions of said build plate to cure binder and hold the first powder and the second powder together where at least one binder has been placed.

8. The printer of claim 7 wherein said curing radiation source moves over the entire said build plate.

9. The printer of claim 7 wherein said curing radiation source includes a source of ultraviolet radiation.

10. The printer of claim 7 wherein said curing radiation source includes a source of heat.

11. The printer of claim 1 wherein a second powder remover is provided which is movable over at least portions of said build plate along said major axis to remove unbound second powder in the layer; and wherein the major transport mechanism carries at least said first powder dispenser, said second powder dispenser, said first powder remover, and said second powder remover over said build plate substantially linearly from a first end of said build plate to a second end of said build plate, said first end opposite said second end.

12. The printer of claim 11, wherein said transport mechanisms, powder dispensers, binder jets and powder removers are in coordination with each other to form a plurality of identical and non-identical objects on said build plate, and wherein the coordination is controlled by a computer.

13. The printer of claim 12 wherein said curing radiation source is a series of UV LEDs individually addressable by the computer.

14. The printer of claim 1 wherein a third powder dispenser of the plurality of powder dispensers mountable on said major transport mechanism movable over at least portions of said build plate along said major axis for dispensing a third powder into cavity regions formed by the removal of unbound first and second powders.

15. The printer of claim 14, wherein said third powder is a fugitive material.

16. The printer of claim 15, wherein said curing radiation source volatilizes the fugitive material leaving a void region in place of the fugitive material.

17. The printer of claim 1, wherein said minor axis is orthogonal to said major axis.

18. The printer of claim 1 wherein said binder jet comprises a print head, the length of said print head being less than the width of said build plate, said print head mounted on said minor transport mechanism for transport along said minor axis, said minor transport mechanism mountable on said major transport mechanism and movable along said major axis, said minor axis being orthogonal to said major axis.

19. The printer of claim 1 wherein said binder jet comprises a full width print head, the length of said full width print head being at least equal to the width of said build plate, said print head mountable on said major transport mechanism and movable along said major axis.

20. The printer of claim 1 wherein said curing radiation source is mountable to said major transport mechanism movable over at least portions of said build plate along the major axis to cure binder placed on said powder layers.

21. The printer of claim 1 wherein said curing radiation source is a UV radiation source, the length of said UV radiation source being less than the width of said build plate, said UV radiation source mounted on a minor transport means for transport along a minor axis movable over at least portions of said build plate to cure binder and hold the first powder and the second powder together where at least one binder has been placed, said minor axis being orthogonal to said major axis.

22. A method for multi-material three dimensional printing, including the steps of:
  providing a major transport mechanism movable along a major axis of a build plate in engageable coordination with a minor transport mechanism movable along a minor axis of said build plate;
  dispensing a first powder in a first powder layer along a major axis over a build plate;
  first applying binder along a minor axis to combine with portions of the first powder layer;
  removing first powder from portions of the first powder layer not contacted by the binder;
  dispensing a second powder in a second powder layer along said major axis over the build plate, the second powder different from the first powder;
  second applying binder along said minor axis to combine with portions of the second powder layer;
  removing second powder from portions of the second powder layer not contacted by the binder;
  repeating said dispensing a first powder step in a new layer above a previous completed layer;
  repeating said first applying binder step to portions of the new layer; and
  repeating said removing first powder step.

23. The method of claim 22 wherein said first applying step and said second applying step include jetting at least one binder from a print head.

24. The method of claim 23 wherein a different binder is used in said first applying binder step than in said second applying binder step.

25. The method of claim 23 wherein a common binder is used in said first applying binder step and in said second applying binder step.

26. The method of claim 22 wherein said dispensing a first powder step precedes said first applying binder step.

27. The method of claim 22 wherein said first applying binder step precedes said dispensing a first powder step.

28. The method of claim 22 including the further step of curing the binder after said first applying binder step and after said second applying binder step.

29. The method of claim 22 including the further step of limiting areas over said build plate to particular regions for said dispensing a first powder step and/or said dispensing a second powder step.

30. The method of claim 22 including the further step of limiting areas over the build plate to particular regions for said first applying binder step and/or said second applying binder step.

31. The method of claim 22 wherein said removing second powder step is followed by steps of dispensing a third powder into cavity regions formed by the removal of unbound first and second powders.

32. The method of claim 31, wherein the third powder is a fugitive material.

33. The method of claim 32, further comprising volatilizing the fugitive material by a later sintering or heating step leaving a void region in place of the fugitive material.

* * * * *